United States Patent [19]

Zinno

[11] Patent Number: 4,461,609

[45] Date of Patent: Jul. 24, 1984

[54] SELF-PROPELLED WHEELCHAIR VEHICLE

[76] Inventor: Clarence H. Zinno, 2912 Hidalgo Dr., Orlando, Fla. 32806

[21] Appl. No.: 381,035

[22] Filed: May 24, 1982

[51] Int. Cl.³ .............................................. B62D 61/08
[52] U.S. Cl. .................................... 414/495; 180/210; 180/907; 414/921
[58] Field of Search ............... 180/DIG. 3, 215, 210; 414/546, 556, 921; 248/404; 410/3, 4, 7; 280/751, 242 WC, 289 WC, 203; 296/63

[56] References Cited

U.S. PATENT DOCUMENTS

| | | | |
|---|---|---|---|
| 1,951,508 | 3/1934 | Emmert | 248/404 |
| 3,984,014 | 10/1976 | Pohl | 414/921 X |
| 4,062,209 | 12/1977 | Downing et al. | 410/3 X |
| 4,103,934 | 8/1978 | Arhnolt et al. | 280/751 X |
| 4,138,023 | 2/1979 | Rohrs et al. | 414/921 X |
| 4,221,276 | 9/1980 | Mitchell et al. | 180/DIG. 3 X |
| 4,273,360 | 6/1981 | McLoughlin et al. | 280/751 |
| 4,313,517 | 2/1982 | Pivar | 180/210 X |

*Primary Examiner*—John A. Pekar
*Attorney, Agent, or Firm*—Duckworth, Allen, Dyer & Pettis

[57] ABSTRACT

A lightweight self-propelled vehicle of the tricycle type with all controls reachable by an occupant seated in a wheelchair. A retractable ramp lowers to ground level to permit entry of a person in a wheelchair. The person raises the ramp to provide clearance with the ground, and locks the raised ramp and the wheelchair to the frame of the vehicle. A small horsepower gasoline engine drives the rear wheels via a centrifugal clutch and a single speed transmission having a reversing gear. A hand hydraulic pump operates a hydraulic cylinder for raising and lowering the wheelchair ramp.

6 Claims, 9 Drawing Figures

SELF-PROPELLED WHEELCHAIR VEHICLE

BACKGROUND OF THE INVENTION

1. Field of the Invention

The present invention relates to vehicles for handicapped persons and more particularly to a self-propelled vehicle that a person in a wheelchair can enter and operate.

2. Description of the Prior Art

A number of vehicles have been developed to assist handicapped persons in traveling from place to place. However, known vehicles have certain disadvantages. For example, vans have been equipped with automatic loading means for lifting a person in a wheelchair into the van but the person must then work himself into the driver's seat. The cost of a van with the additional mechanisms required so that it can be operated by a handicapped person makes the cost prohibitive to many people, particularly those with limited income. An ideal vehicle would be one in which the person confined to a wheelchair could enter in the wheelchair without assistance and could operate the controls of the vehicle from the wheelchair.

Forester in U.S. Pat. No. 3,921,740 has proposed a vehicle having a sloping rear ramp which the wheelchair occupant can use to enter the vehicle. The ramp is closed by a lever arrangement and serves to prevent the wheelchair from rolling out. The Forester vehicle is open and not suitable for inclement weather operation. Further, guiding the wheelchair onto the narrow ramp represents some danger to a handicapped person having limited control of his wheelchair. In U.S. Pat. No. 3,912,032, Benz, et al teach a motorized front wheel of the bicycle type having a yoke which can be attached to the arms of a wheelchair to power the combination. However, in this arrangement the wheelchair wheels are in contact with the ground. Although this unit may be economical, it is not satisfactory for street use since bumps, potholes, and the like would be disastrous to the wheelchair wheels with great risk of accident. Furthermore, the wheelchair tires are generally constructed for indoor use and would quickly wear out if exposed to a roadway. Mitchell, et al in U.S. Pat. No. 4,221,276 disclose a motorcycle sidecar which may be coupled to a motorcycle which permits a person to enter the sidecar in a wheelchair and to control the motorcycle from the sidecar. The device is open to the elements. The available power from a motorcycle could represent a danger to a handicapped person. A number of wheelchair and tractor combinations have been proposed as exemplified by U.S. Pat. No. 2,710,659 to Moederle, U.S. Pat. No. 2,468,801 to Beall, and U.S. Pat. No. 2,931,449 to King. Although useful for some persons, these special purpose vehicles do not accept a driver seated in a conventional wheelchair.

Therefore, there is a need for a low cost powered vehicle which will have a limited speed for safety and which will accept a standard wheelchair. The vehicle should be enclosed to protect the occupant in case of rain or other unfavorable weather conditions. The wheelchair occupant should be able to enter the vehicle in the wheelchair with complete safety and then be able to operate all controls from the wheelchair.

SUMMARY OF THE INVENTION

My invention is lightweight self-propelled vehicle of the tricycle type having a handlebar steering arrangement with all controls easily reachable by an occupant seated in a wheelchair. A novel retractable ramp is provided for entry into the vehicle. When unoccupied, the ramp is lowered and rests on the ground. Thus, the person in a wheelchair may roll directly onto the ramp without the need to negotiate a steep slope. After the wheelchair is in place on the ramp, a hydraulic cylinder raises the ramp to the floor level of the vehicle with a safety catch securing the ramp in place. Clamps attached to the vehicle chassis frame are then secured to the sides of the wheelchair to prevent movement or shifting of the wheelchair during use of the vehicle. A rear safety bar may also be provided as an additional safety factor. A pair of rear wheels is mounted in individually sprung wheel mounts pivoted at the rear of the chassis frame.

The vehicle uses a lightweight framework having a canvas roof, and a plastic windshield and side windows. The body portion of the vehicle may be covered with thin aluminum or the like for protection of the occupant from debris in the streets as well as to provide an element of privacy not available in the prior art open-type vehicles. Either an electric or a gasoline power plant may be provided for driving the vehicle. To minimize the cost, I prefer a vertical shaft gasoline engine such as used in lawn mowers. Such engines are mass produced and are available at very reasonable prices. The speed of the vehicle can be limited by limiting the horsepower of the engine used. Although many power transmission methods will be obvious to those of skill in this art, I prefer to use an automatic centrifugal clutch coupled directly to the engine crankshaft which will drive, via pulleys and belts, a freewheel one-way drive coupled to a transmission which will provide forward and reverse directions. The output from the transmission will operate a jack shaft using standard sprockets and chains with the jack shaft driving a rear wheel of the three wheeled vehicle. The front wheel is mounted in a fork and controlled by a set of handlebars mounted to be just forward of the wheelchair when in position. Although many braking systems may be used, I prefer a front disc brake arrangement with a control lever on one handlebar and rear disc brakes with a control lever on the other handlebar. A handlebar throttle arrangement such as used conventially on motorcycles may be employed to control the engine speed. A small dashboard may mount various controls. Conveniently, I prefer to mount the engine on the centerline of the vehicle on a mounting plate at the front of the vehicle chassis and within reach of the wheelchair occupant. A rope starter may be provided on the engine for persons who have sufficient control and strength to operate a manual starter. Otherwise, an electric starter may be used with a battery and battery carrier mounted outboard of the vehicle.

Therefore, it is a principal object of my invention to provide a low cost, enclosed vehicle to provide mobility for handicapped persons.

It is a further object of my invention to provide a powered vehicle having a ramp which may be raised and lowered and onto which a handicapped person in a wheelchair may roll the wheelchair without negotiating a sloping ramp.

It is yet another object of my invention to provide a ramp access for a wheeled vehicle in which the wheelchair user enters the ramp while it is at ground level and operates a hydraulic pump to raise the ramp to the floor level of the vehicle.

It is a further object of my invention to provide a propelled vehicle which can be driven by a person in a wheelchair and which can be manufactured at low cost.

It is still a further object of my invention to provide a propelled vehicle for handicapped persons in a wheelchair and which is enclosed for protection of the occupant from the elements.

It is still a further object of my invention to provide a low cost self-propelled vehicle which a handicapped person in a wheelchair may enter unaided, and conveniently and safely operate the vehicle from the wheelchair.

These and other objects and advantages of my invention will become apparent from the following detailed description and drawings.

DETAILED DESCRIPTION OF THE PREFERRED EMBODIMENT

Figure 1:
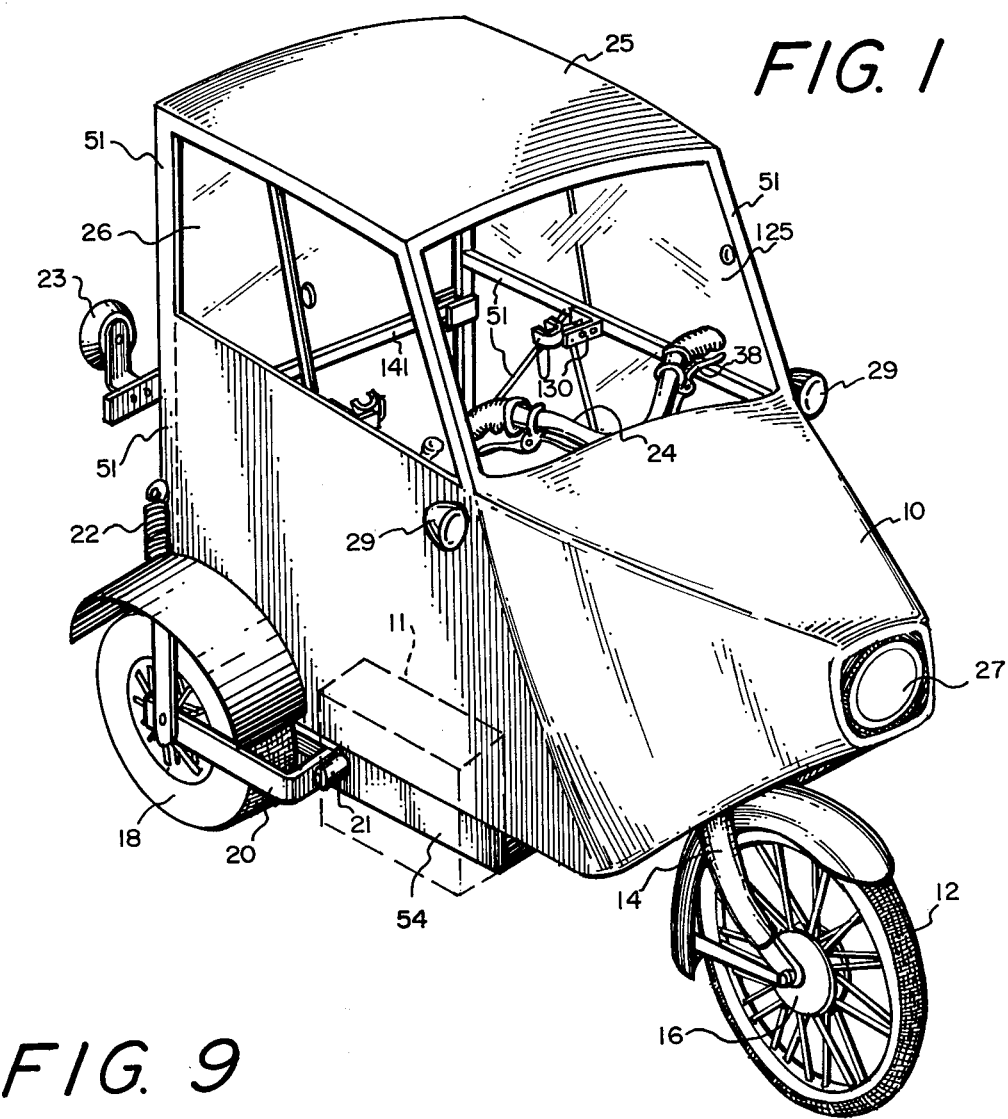
FIG. 1 is a perspective view of the vehicle of the invention unoccupied.

Referring to FIG. 1, a perspective view of a self-propelled vehicle for handicapped persons in accordance with my invention is shown. A portion of the chassis 54 may be seen having a body framework formed by member 51 mounted thereon as will be described in more detail with respect to FIG. 5. A pair of rear wheels 18 is mounted in individually sprung wheel frames 20. Wheel frame 20 pivots at mounting point 21 on chassis portion 54 and is supported by combination spring and shock absorber 22 from a vertical member 51. A single front wheel 12 is provided mounted in fork 14 as will be shown in more detail hereinafter. Front wheel 12 may utilize a disc brake 16 operated via cable by handlebar lever 38. Handlebars 24 are suitably coupled to forks 14 to provide steering of the vehicle.

A body superstructure formed by members 51 is covered with light metal 10 such as aluminum to enclose a major portion of the vehicle. A clear plastic windshield 125 is provided with side windows 26 also of plastic. Preferably, windows 26 are made in two pieces having a rear fixed portion and a slidable forward portion which is shown opened on the right side of the vehicle of FIG. 1. A headlight 27 and tail lights 23 may be installed if the vehicle is to be used after dark. Cowl lights 29 may provide additional visibility at night. Top 25 may be formed from canvas or similar material. A roll type rear canvas curtain may be provided if desired.

As indicated by dashed lines 11 in FIG. 1, an outboard battery box may be attached to chassis member 54 when electric starting is to be used for the gasoline motor or for operation of lights.

Figure 2:
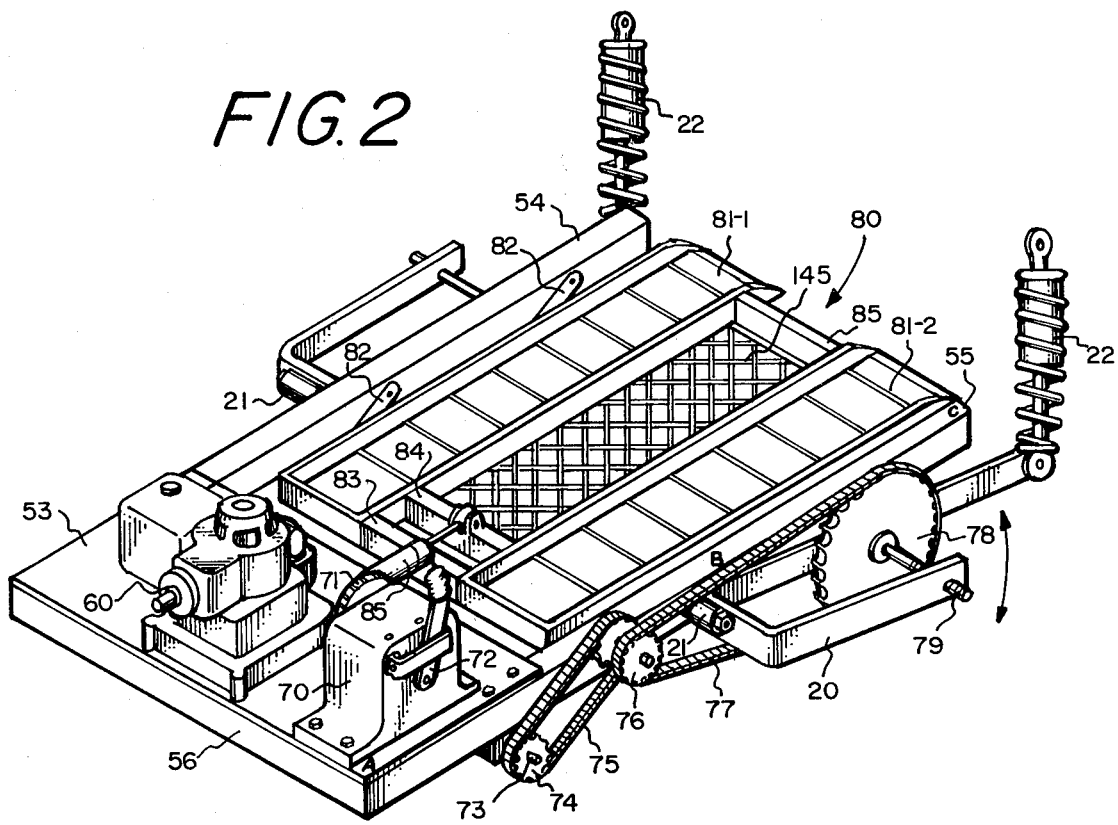
FIG. 2 is a perspective view of the chassis of the vehicle showing the ramp portion in its up position.

Turning now to FIG. 2, details of the chassis frame formed by frame members 54, 55 and 56 are shown. At the forward end, a plate 53 may be attached to frame 54, 55 and 56 for mounting elements of the drive system. I prefer that frame members 54, 55 and 56 be fabricated from rectangular steel tubing which may be 1"×2". To minimize weight, plate 53 may be a suitable thickness aluminum plate.

Gasoling engine 60, may be from 7½ to 15 horsepower depending upon the weight of the user and the speed desired. Engine 60 utilizes a vertical drive shaft which projects through plate 53 as will be discussed below. Transmission 70 is provided having a shift lever 72 to change from one output shaft rotation direction to the opposite rotation direction. Transmission output sprocket 71 seen partially in the drawing of FIG. 2 drives jack shaft 73 having sprocket 74. Rear wheels 18 (of FIG. 1) mount in wheel frames 20 which are pivoted at 21 on frame members 54 and 55, respectively. The left rear wheel 18 is driven by sprocket 78 from jack shaft 73 via sprocket 74, chain 75, idler sprockets 76, and chain 77. The wheel frames 20 are supported at the rear end thereof by spring-shock absorber 22 with the upper end fastened to a frame member 51 as previously mentioned.

A ramp 80 is provided upon which a wheelchair will rest during use of the vehicle. Ramp 80 consists of two track portions 81-1 and 81-2 having a spacing to receive a range of standard wheelchair wheel spacings. Ramp tracks 81 may be constructed from 16 gage steel channel or may be fabricated from aluminum. Cross members 83, 84 and 85 may be formed from 1"×2" square tubing welded to the wheel channels. The space between wheel channels 81 may be covered with an aluminum mesh or the like 145 to prevent street debris from entering the vehicle. Ramp 80 is supported between frame members 54 and 55 by swing arms 82 best seen in FIGS. 3 and 4.

Figure 3:
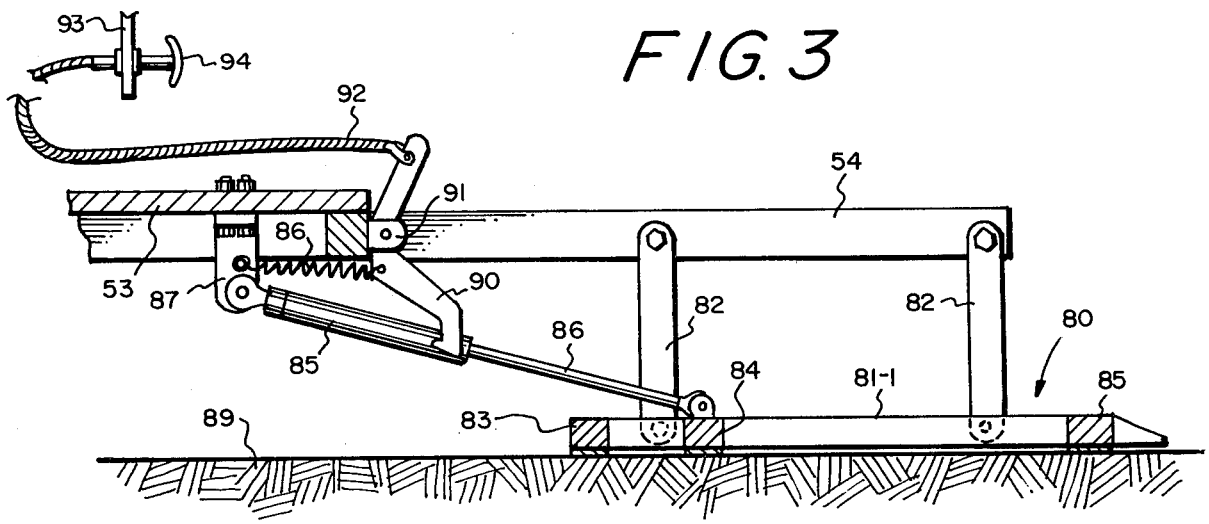
FIGS. 3 and 4 are cross sectional views of the chassis and ramp of FIG. 2, with FIG. 3 showing the ramp in the lowered position and in FIG. 4, the ramp in the raised position.
Figure 4:
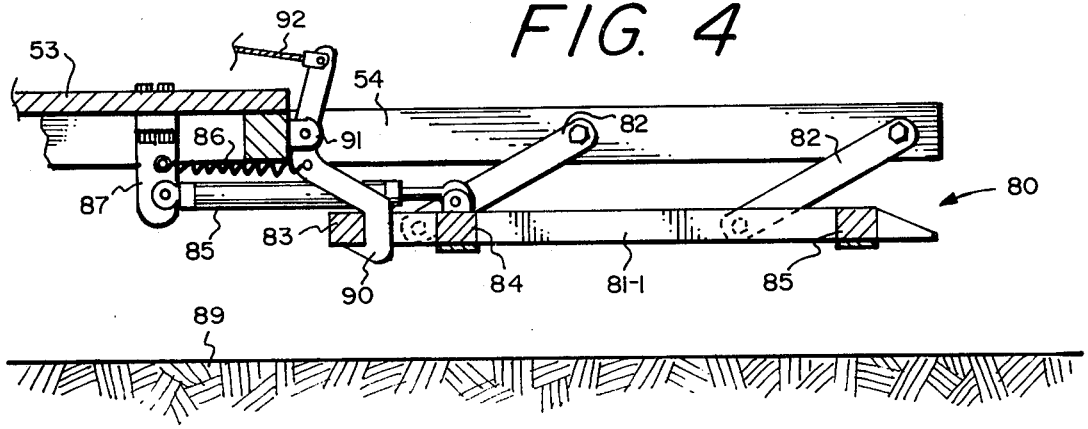

FIG. 3 shows a cross section through ramp 80 with ramp 80 in its lowered position in contact with the ground 89. This represents the ramp position when the vehicle is not in use and is ready for boarding by a person in a wheelchair. When it is desired to raise the ramp for moving the vehicle, a hydraulic system to be described hereinbelow is energized which operates hydraulic cylinder 85. As piston rod 86 retracts into cylinder 85, ramp 80 is drawn forward and upward until it reaches the position shown in FIG. 4 which represents the fully raised position. Safety catch 90, which is held in the position shown by spring 86 and is pivoted on bracket 91, will capture crosspiece 83 when ramp 80 reaches its uppermost position. Thus, safety catch 90 provides positive locking of the ramp 80 in place for driving of the vehicle. When it is desired to lower the ramp 80, a release handle 94 on a convenient portion of the dashboard area 93 is pulled, causing cable 92 to swing safety catch 90 at pivot point 91 thereby releasing ramp cross member 83. Hydraulic fluid, as will be later described, is released from cylinder 85 permitting ramp 80 to lower back to the position of FIG. 3 by means of swing arms 82. It is to be understood that swing arms 82 shown in FIGS. 3 and 4 attach to frame member 54 and a second set is attached to left ramp track 81-2 and pivots from frame member 55.

Figure 5:
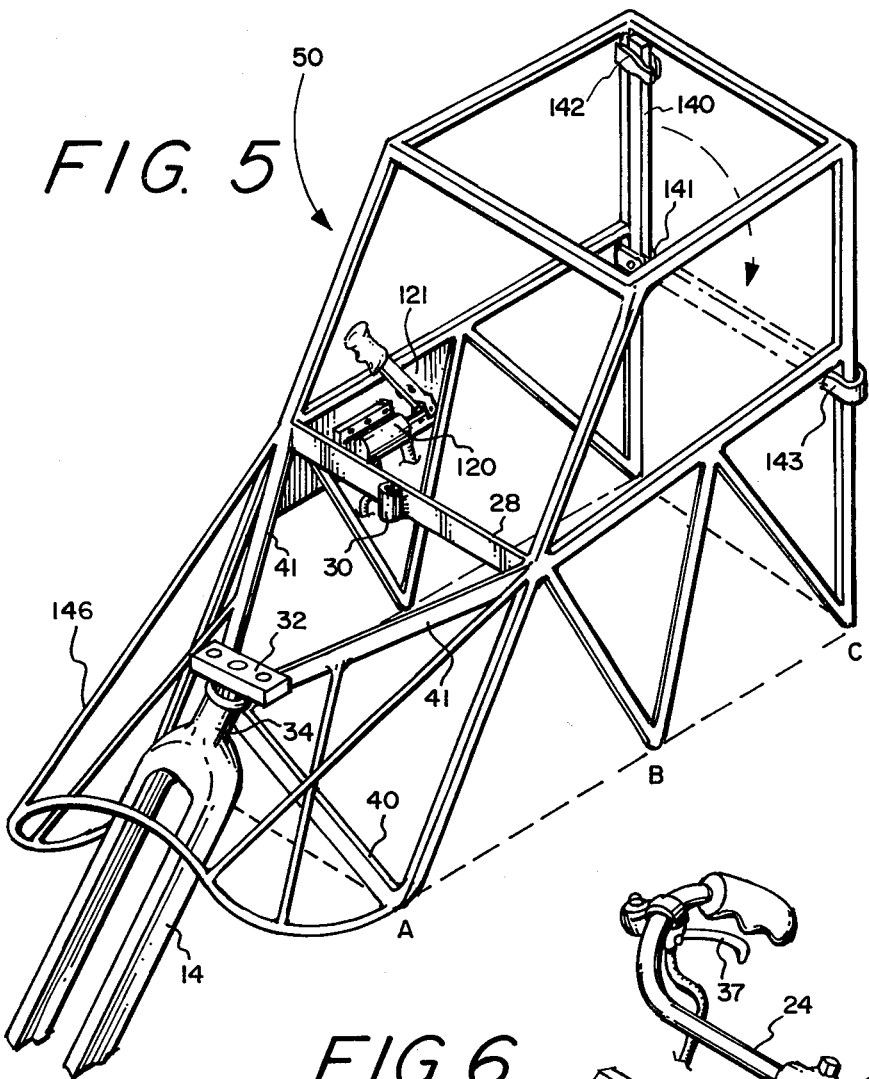
FIG. 5 is a partial view of the vehicle body superstructure to be attached to the chassis of FIG. 2.

In FIG. 5, details of the vehicle body superstructure are shown. Superstructure 50 is preferably fabricated from 1" square steel tube with each joint welded. Referring back to FIG. 2, points A, B and C on the left side of superstructure 50 are welded to similarly labeled points on frame member 55 and the complementary points on the right side of superstructure 50 attach to the equivalent points on frame member 54. A transverse member 28 is welded as shown in FIG. 5 and supports a handlebar bearing assembly 30. A pair of 1" square steel tubing members 41 extend forward from bar 28 and are welded to fork bearing assembly 34. A pair of 1"×2" square steel tube members 40 also are welded to fork bearing 34 and to the chassis and superstructure at point A of both sides of the framework. A lightweight frame 146 which may be formed from ⅝" round steel tubing supports the nose portion of the body 10.

Figure 6:
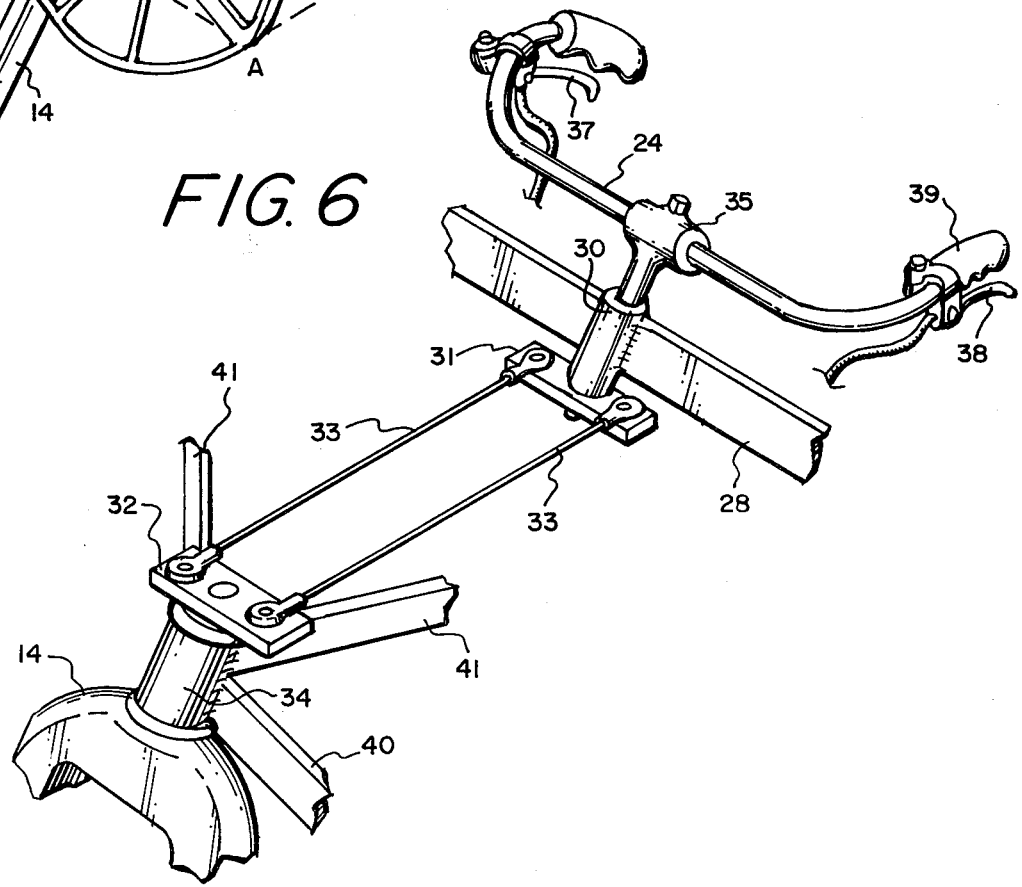
FIG. 6 is a partial view of the front fork and the handlebar arrangement for steering of the vehicle.

In FIG. 6, details of the handlebar steering arrangement are shown. As indicated in FIG. 5, fork 14 rotates in fork bearing assembly 34 and includes a bar 32 attached to the upper end of fork 14. As shown in FIG. 6, a handlebar stem 35 rides in bearing assembly 30 having bar 31 at its lower end. Bar 31 is connected to bar 32 by rods 33 to permit fork 14 to be turned by handlebars 24 and stem 35. Handlebar grip 39 may be connected to the throttle of engine 60 for control of the vehicle speed. Brake lever 38 operates disc brake 16 and brake lever 37 controls similar disc brakes on rear wheels 18 (not shown).

Figure 7:
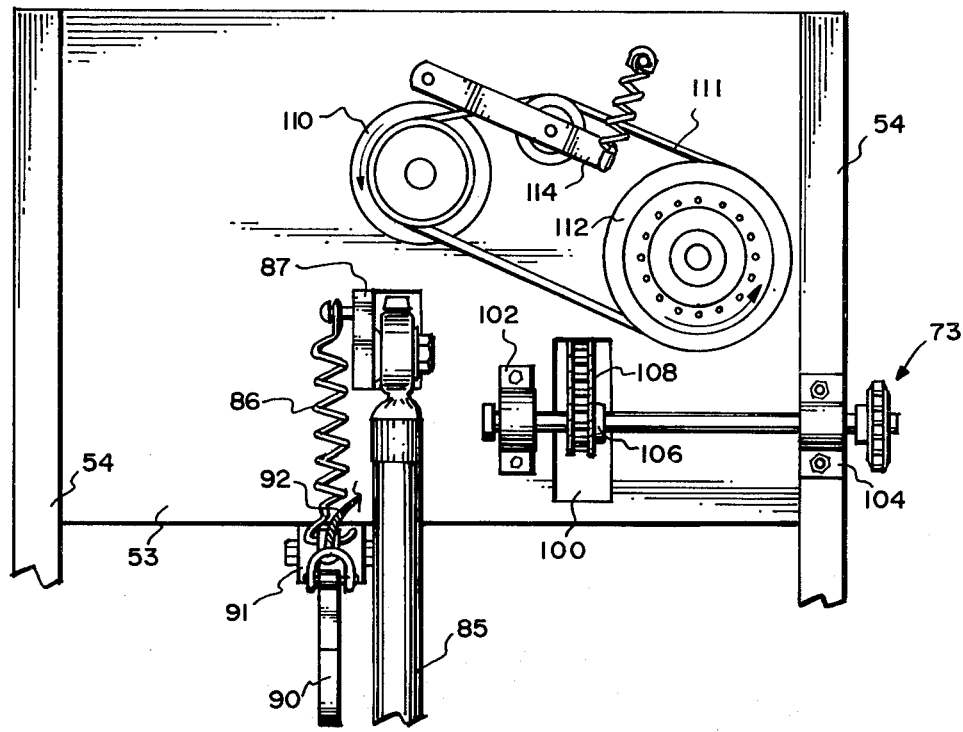
FIG. 7 is a bottom view of the forward portion of the chassis of FIG. 2 showing the transmission driving arrangement and details of the jack shaft.

Turning now to FIG. 7, additional details of the driving system are shown. FIG. 7 is a bottom view of plate 53. Automatic centrifugal clutch 110 is mounted on the output shaft of gasoline motor 60 which projects through plate 53. Centrifugal clutch 110, when engaged, drives one-way drive 112 by means of belt 111. An idler 114 maintains tension on belt 111. The direction of rotation of clutch 110 when engaged is indicated by the arrow. One-way drive 112 is arranged to drive in one direction as indicated by the arrow. Otherwise, drive 112 rotates freely to permit coasting of the vehicle. One-way drive 112 is coupled to the input shaft of transmission 70 mounted on the top side of plate 53. Output sprocket 71 of transmission 70 is coupled by chain 108 to sprocket 106 on jack shaft 73. As may be noted from FIG. 7, an opening 100 in plate 53 provides clearance for chain 108. Jack shaft 73 is mounted on two pillow block bearings 102 and 104.

Also shown in FIG. 7 is hydraulic cylinder 85 mounted on bracket 87 attached to plate 53. The mounting of safety catch 90 is also indicated.

Figure 8:
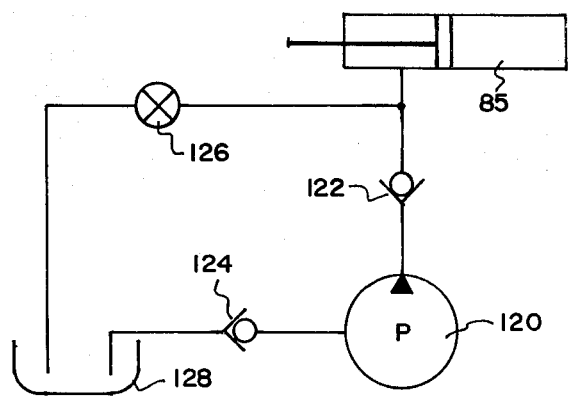
FIG. 8 is a schematic diagram of the hydraulic system used in lowering and raising the ram.

FIG. 8 is a schematic diagram of a typical hydraulic system used to raise ramp 80 from its lowered position. Pump 120 may be a manually operated hydraulic pump and may be mounted in any convenient location that the occupant of a wheelchair may be able to operate when in position. For example, in FIG. 5, hand hydraulic pump 120 is shown mounted on plate 121 welded to superstructure 50. Assuming that the ramp 80 is in the lowered position and the user has rolled his wheelchair onto the ramp 80, he then locks the wheels on the wheelchair and closes release valve 126 which may be any convenient type of hydraulic valve having a positive shutoff position and a positive open position. The user then operates pump 120. Hydraulic fluid is drawn from reservoir 128 via inlet check valve 124 and flows out of pump 120 through outlet check valve 122 to hydraulic cylinder 85 which retracts. As the cylinder retracts, the ramp, wheelchair and occupant are raised toward the desired position. As the ramp reaches safety catch 90, it operates the catch to captivate ramp member 83. The user then terminates operation of the pump.

When it is desired to lower the ramp 80, release valve 126 is opened and safety release handle 94 pulled to release safety catch 90 from ramp member 83. The weight of the occupant, wheelchair and ramp working against the fluid in cylinder 85 forces the fluid out through release valve 126 to reservoir 128 permitting the piston rod 86 to extend and the ramp 80 to slowly settle to the ground. The rate of descent may be, of course, controlled by a restriction in the release valve line or by selecting a suitably restricted release valve.

Although I have described here a manually operated pump system which is preferred for its low cost and high reliability, it is, of course, possible to provide a small hydraulic pump driven from the vehicle engine for an occupant who is unable to operate a manual pump.

Figure 9:
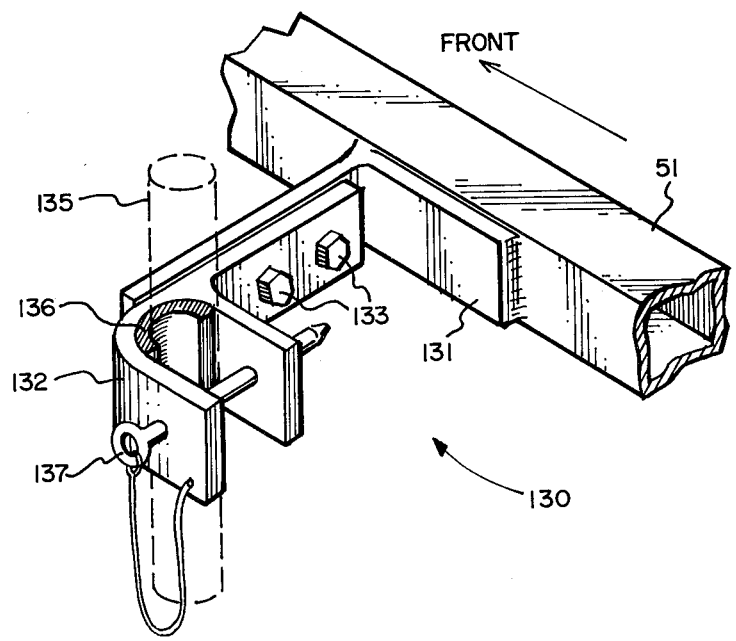
FIG. 9 is a view of a typical wheelchair lock.

After the occupant of the wheelchair has entered the vehicle, raised the ramp and locked it in the upper position, it is necessary to secure the wheelchair against motions while driving the vehicle. Although some help is provided by the normal wheelchair locks, I provide a pair of safety locks 130 one of which is shown in FIG. 9. The pair of locks 130 is installed with one on either side of the superstructure 50 as may be seen in FIG. 1. Details of a lock are indicated in the drawing of FIG. 9. Here, superstructure member 51, which may be considered to be the horizontal member on the right side, has a bracket 131 welded thereto. A second bracket 132 is bolted to bracket 131. Bracket 132 includes a U-shaped opening for receiving a vertical member 135 of a wheelchair shown in phantom view. As may be recognized, as the ramp raises the wheelchair, the occupant may assist in guiding the appropriate wheelchair members 135 into the locks 130. The U-shaped portion of bracket 132 may include rubber or other resilient material 136 for cushioning. After the member 135 is in place in the lock 130, a captivated pin 137 is inserted through bracket 132 as shown in FIG. 9 to secure the wheelchair. Although not shown in detail, bracket 131 includes a slot for engaging bolts 133 to permit bracket 132 to be adjusted to fit various sizes of wheelchairs. Although I prefer this simple and low cost lock, it would be obvious to provide various other locking arrangements including clamps, straps and the like.

As a further safety feature, I prefer to provide a rear locking bar seen in FIG. 5. Here, bar 140, which may be a 1"×1" steel tube, is pivoted to superstructure 50 by pivot bracket 141. When entering or exiting the vehicle, bar 140 is folded upward into clip 142. After the wheelchair is in place and the ramp 80 is raised to its operating position, the occupant may reach backward and flip bar 140 down to the horizontal position shown by the dashed lines in which case it is held in clip 143. Thus, bar 140 would guard against the wheelchair rolling backward. It is also possible to couple an automatically controlled safety bar to the ramp such that raising the ramp automatically lowers the safety bar into place as the occupant raises the ramp.

I have now disclosed a low cost novel, self-propelled vehicle into which a person seated in a wheelchair can enter, raise the entrance ramp, lock the wheelchair in place, and thereafter operate the vehicle on public streets. Thus, my invention will permit handicapped persons to shop, attend church, motion pictures and other neighborhood activities without help, offering an independence not easily achievable otherwise.

Although I have shown a preferred implementation, it will be obvious to those of skill in the art to make various modifications without departing from the spirit and scope of my invention.

I claim:

1. In a self-powered wheeled vehicle having a chassis frame and protective body, the improvement comprising the combination of:
   a flat ramp disposed parallel to the ground in a first position to permit a wheelchair to be moved by its occupant onto said ramp;
   coupling means between said ramp and said chassis frame;
   power means attached to said chassis frame and coupled to said ramp for raising said ramp from said first position to a second position parallel with said first position to provide clearance between said flat ramp and said ground, said power means controllable by the occupant of said wheelchair; and
   vehicle operating controls disposed adjacent to a wheelcahir on said ramp when said ramp is in said second position for permitting an occupant of said wheelchair to drive said vehicle.

2. The vehicle as defined in claim 1 in which said power means is a hydraulic system having a hydraulic pump for hand operation by said occupant and a hydraulic cylinder attached to said chassis frame and to said ramp.

3. The vehicle as defined in claim 2 in which said power means further includes a release valve, wherein said hand pump is operated by said occupant to raise said ramp by retracting said hydraulic cylinder, and said release valve is opened by said occupant to lower said ramp by releasing hydraulic pressure from said retracted hydraulic cylinder.

4. The vehicle as defined in claim 1 in which said protective body includes a windshield, side windows, and a top.

5. The vehicle as defined in claim 1 which further comprises a rear safety bar movably attached to said chassis frame for locking behind a wheelchair on said flat ramp when in said second position.

6. The vehicle as defined in claim 1 which further comprises:
   first locking means for locking said ramp in said second position;
   second locking means for locking a wheelchair on said ramp to said chassis frame; and
   release means associated with said power means to permit lowering of said ramp from said second position to said first position.

* * * * *